US006947411B2

(12) United States Patent
Parker et al.

(10) Patent No.: US 6,947,411 B2
(45) Date of Patent: Sep. 20, 2005

(54) DIGITAL DATA COMMUNICATION SYSTEM USING VIDEO TELEPHONY

(75) Inventors: Benjamin J. Parker, Overland Park, KS (US); Shane R. Werner, Olathe, KS (US); Terry M. Frederick, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 256 days.

(21) Appl. No.: 10/274,736

(22) Filed: Oct. 21, 2002

(65) Prior Publication Data

US 2004/0125789 A1 Jul. 1, 2004

(51) Int. Cl.[7] .............................................. H04L 12/66
(52) U.S. Cl. ...................................................... 370/352
(58) Field of Search ................................ 370/352, 353, 370/354, 355, 356; 379/106.02; 348/14.16; 600/300

(56) References Cited

U.S. PATENT DOCUMENTS

| 5,001,710 | A | * | 3/1991 | Gawrys et al. ............. 370/271 |
| 5,764,916 | A | | 6/1998 | Busey et al. |
| 5,949,763 | A | | 9/1999 | Lund |
| 6,014,432 | A | * | 1/2000 | Modney ................. 379/106.02 |
| 6,311,231 | B1 | * | 10/2001 | Bateman et al. ........ 379/265.09 |
| 6,337,858 | B1 | | 1/2002 | Petty et al. |
| 6,370,137 | B1 | | 4/2002 | Lund |
| 6,699,187 | B2 | * | 3/2004 | Webb et al. ................. 600/300 |
| 6,731,324 | B2 | * | 5/2004 | Levy ........................ 348/14.08 |

FOREIGN PATENT DOCUMENTS

EP          1 059 798          12/2000

OTHER PUBLICATIONS

Andrew J. Klosterman and Gregory R. Ganger, *Secure Continuous Biometric-Enahnced Authentication*, May, 2000.
Gregory R. Ganger, *Authentication Confidences*, Apr., 2001.

* cited by examiner

*Primary Examiner*—Kwang Bin Yao

(57) ABSTRACT

A service provider communication system includes a computer network-enabled workstation for a service provider (e.g., a medical caregiver) and a computer network-enabled communication device for a requester (e.g., a patient) in a location remote from the service provider workstation. A data network interconnects the service provider workstation and the requester communication device, and the service provider workstation and the requester communication device have respective network addresses. A requester information database stores a data record corresponding to the requester. The requester communication device includes a signaling device for generating a request signal and a controller responsive to the request signal for initiating a video communication link between the requester communication device and the service provider workstation using the respective network addresses and for initiating display of the data record at the service provider workstation.

25 Claims, 4 Drawing Sheets

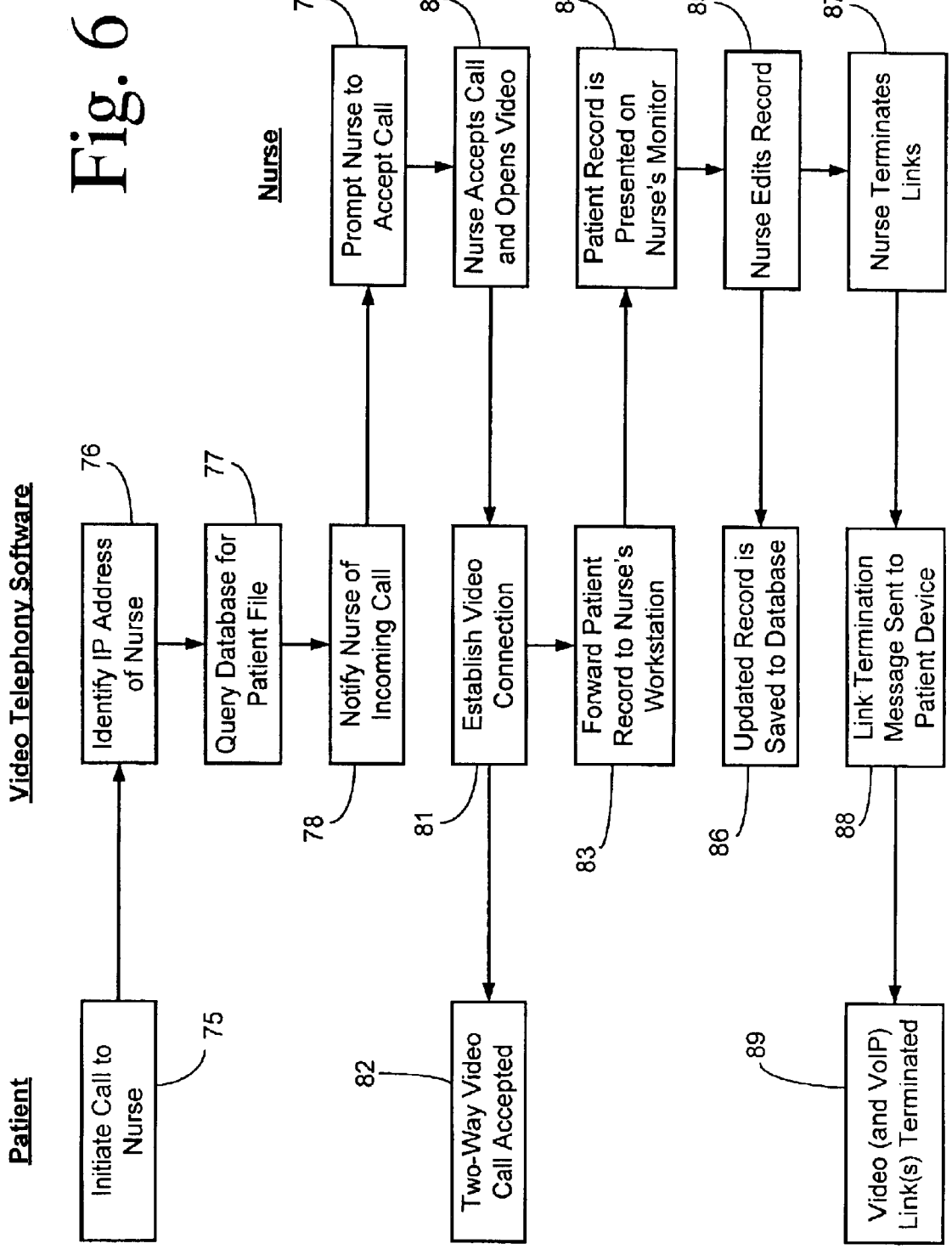

DIGITAL DATA COMMUNICATION SYSTEM USING VIDEO TELEPHONY

CROSS REFERENCE TO RELATED APPLICATIONS

The present application is related to co-pending and commonly assigned U.S. application Ser. No. 10/033,813, filed Dec. 20, 2001, entitled "Telephonic Addressing For Establishing Simultaneous Voice and Computer Network Connections," and Ser. No. 09/978,616, filed Oct. 16, 2001, entitled "Video Telephony," now U.S. Pat. No. 6,545,697, issued Apr. 8, 2003, both incorporated herein by reference in their entirety.

STATEMENT REGARDING FEDERALLY SPONSORED RESEARCH

Not Applicable.

BACKGROUND OF THE INVENTION

The present invention relates in general to providing services (e.g., medical care and supervision) of a service requester (e.g., medical patient) by a service provider not in the same immediate location, and, more specifically, to a video telephony system for conducting communications supplemented by presenting digital data records to a service provider automatically in response to a video telephony call.

In connection with providing medical care to patients, it is desirable to minimize the costs of care without compromising the quality of care. One manner of controlling costs is to treat a patient at home, thereby avoiding costs associated with a stay at a hospital. Regular nurse visitations and/or a caregiver on standby or "on-call" status are provided in order to attend to the needs of the home patient; however, the response time to react to an emergency medical situation is typically longer than when the patient is checked into a hospital.

In the context of hospitalization, costs can be reduced by controlling the size of the caregiving staff (e.g., nursing staff) to maximize the ratio of patients to caregiver. By maximizing the number of patients that can be handled by one caregiver, a greater cost reduction can be realized. Nevertheless, sufficient staff must be maintained to handle emergencies which may occur.

In a real or perceived emergency situation, a nurse or other caregiver needs to quickly establish communication (e.g., in-person communication or remote communication such as a telephone call or intercom) with the patient in order to assess their immediate needs, determine and administer an appropriate course of action, and to reassure the patient that any necessary care is forthcoming. An emergency alert may be manually initiated by a homebound patient placing a telephone call to a caregiver, by a patient pressing a call button in a hospital room, or by an automatic patient monitor detecting an alert condition. Once an emergency situation arises, the caregiver typically needs to 1) identify the patient, 2) retrieve the patient's charts or is other records, 3) obtain any real-time monitoring or other information from the patient, 4) communicate any instructions or reassurances to the patient, 5) dispatch any needed assistance, and 6) update the patient's charts. A face-to-face visit (whether to a homebound patient or in a hospital room) is a relatively inefficient use of a caregiver's time, however, a conversation over an intercom or a telephone call provide only limited audio information which may be inadequate to address certain situations.

In connection with routine telephone calls to a service provider (medical or non-medical) or any other non-emergency communications, it can often be expected that some file records or other digital information associated with the initiator of the communication (e.g., a calling party) will be needed by the provider in handling the communication. For example, when making a routine telephone call to a doctor's office, the handling of the call is typically lengthened by the need of a responder (e.g., nurse) to access a patient file (electronic or paper). The nurse or other provider must manually initiate the file retrieval since it depends upon first learning of the identity of the requester (e.g., calling party).

SUMMARY OF THE INVENTION

The present invention has the advantages of efficient deployment of medical caregiver or other service provider resources while increasing the quality and information content of communication in response to a request or an emergency alert signal. In particular, video telephony is coupled with automatic access to an electronic database of data records pertaining to the requester (e.g., patient) which are automatically displayed to the provider (e.g., caregiver). Thus, patient care and comfort are improved while the time required to make a medical assessment and the costs of providing service are reduced.

In one aspect of the invention, a service provider communication system comprises a computer network-enabled workstation for a service provider (e.g., a medical caregiver) and a computer network-enabled communication device for a requester (e.g., a patient) in a location remote from the service provider workstation. A data network interconnects the service provider workstation and the requester communication device, and the service provider workstation and the requester communication device have respective network addresses. A requester information database stores a data record corresponding to the requester. The requester communication device includes a signaling device for generating a request signal and a controller responsive to the request signal for initiating a video communication link between the requester communication device and the service provider workstation using the respective network addresses and for initiating display of the data record at the service provider workstation.

BRIEF DESCRIPTION OF THE DRAWINGS

FIG. 6 is a flowchart of a preferred method of patient to nurse communications using video telephony software.

DETAILED DESCRIPTION OF PREFERRED EMBODIMENTS

Figure 1:
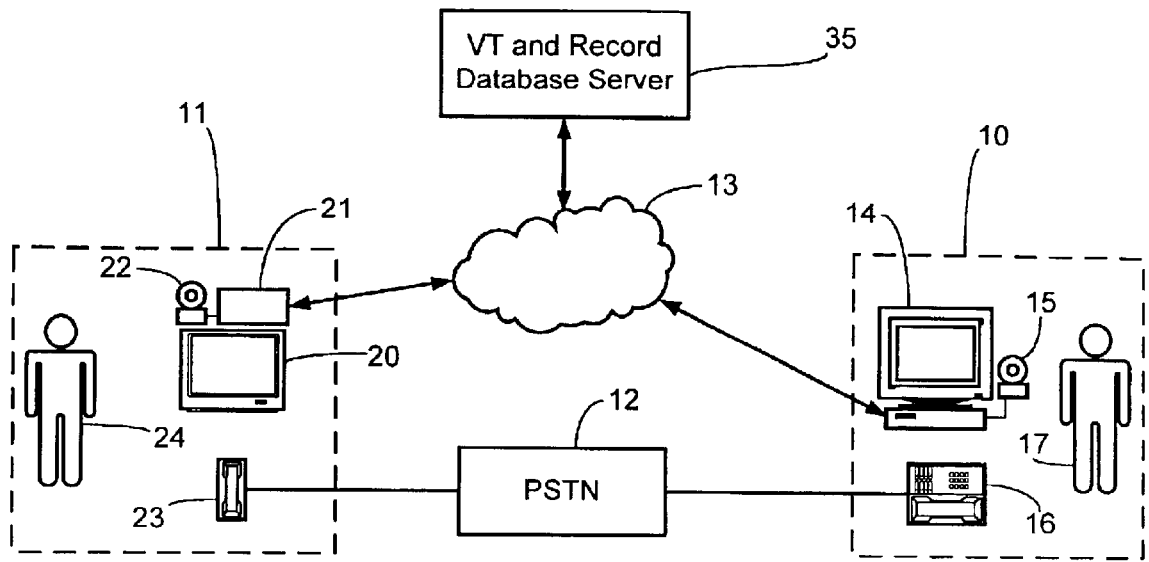
FIG. 1 is a block diagram of a first embodiment of a system of the present invention.

Referring to FIG. 1, the present invention includes audio and video communication links between a service provider workstation 10 and a remote location 11. Audio (e.g., voice)

communication may take place via a telephone network, such as a public switched telephone network (PSTN) 12, and/or using computer telephony, such as Voice over IP (VoIP), transported over a data network 13 (e.g., the Internet). A video communication link is provided via data network 13.

Service provider workstation 10 comprises a network-enabled personal computer workstation 14 including various peripherals (such as a video camera 15) and a telephone 16 which are used by a service provider agent (e.g., nurse) 17. Remote location 11 may, for example, be at a private business or residence or may be a patient's room at a hospital. Location 11 includes a requester communication device for use by a requester 24. The communication device is computer network-enabled and may comprise a television monitor 20, a set-top box 21, a video camera 22, and a telephone 23. Set-top box 21 may include additional peripherals (not shown) and alternatively may comprise a personal computer workstation rather than a television monitor and set-top box.

The present invention may initiate video telephony communication sessions as described in co-pending U.S. application Ser. No. 10/033,813, filed Dec. 20, 2001, entitled "Telephonic Addressing For Establishing Simultaneous Voice and Computer Network Connections," and Ser. No. 09/978,616, filed Oct. 16, 2001, entitled "Video Telephony," now U.S. Pat. No. 6,545,697, issued Apr. 8, 2003. Thus, an interconnection (not shown) between telephone 23 and set-top box 21 which may include a separate device (not shown) for capturing a dialed telephone number may be used. A video telephony and record database server 35 is provided for performing the functions of the central server as described in the prior applications. In addition, server 35 may be used to store and make available to service provider 17 digital data pertaining to requester 24, although such data records can also be stored elsewhere in the system (e.g., in a separate server connected to data network 13, in computer workstation 14, or in set-top box 21).

Computer workstation 14 and set-top box 21 have pre-assigned data network addresses (e.g., IP addresses) enabling them to exchange network packets or datagrams over data network 13. A video telephony session of the present invention establishes a video communication link between the respective data network addresses, possibly with server 35 relaying all packets between the two endpoints. When requester 24 initiates a video telephony session, its initiating IP address is, of course, known. Unless the IP address of the service provider workstation is pre-configured into set-top box 21 and then specifically selected by requester 24, it is determined using server 35. Thus, set-top box 21 may be pre-configured with an IP address (or URL) of server 35, and computer workstation 14 registers in advance with server 35 providing its telephone number and IP address. Server 35 maintains this information in a lookup table so that a video communication link can be established in response to a message from the requester's set-top box 21 providing the IP address of the set-top box and the telephone number of the service provider's workstation 10.

Figure 2:
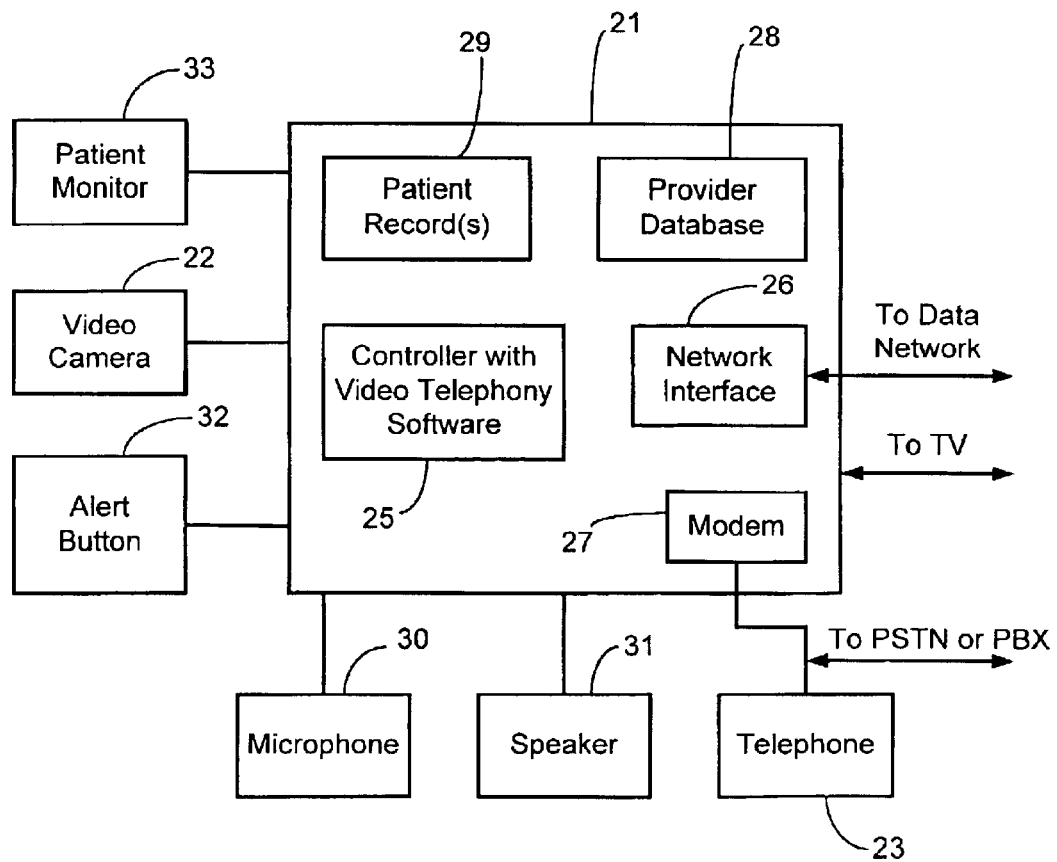
FIG. 2 is a block diagram of one preferred embodiment of a computer network-enabled patient communication device.

Customer premises equipment (CPE) at remote location 11 for providing patient-to-nurse communications is shown in greater detail in FIG. 2. Set-top box 21 includes a controller 25 for executing video telephony software. Controller 25 is responsive to a request (i.e., alert) signal for initiating a video communication link between the requester's communication device and the service provider workstation and for initiating display of a requester's data record at the service provider workstation. A network interface 26 couples set-top box 21 to the data network (e.g., through an Internet Service Provider). Set-top box 21 also includes a modem 27 coupled to the telephone line of telephone 23. Modem 27 may be used to capture dialed digits from telephone 23 and make them available to the video telephony software so that a separate device does not have to be provided for that purpose. The recognition of a telephone number corresponding to a service provider automatically generates the request signal that launches the video link and data retrieval. Once the video link is established, video frames received from the service provider are displayed on television monitor 20.

Set-top box 21 may be preconfigured with a service provider database or identifier 28 which preferably may include the IP address or addresses of service providers (e.g. medical caregivers) if a network-based database of IP addresses is not being used.

The present invention allows any pertinent digital data to be retrieved and then presented to the service provider within a video telephony call. In the presently described embodiment of patient to medical caregiver communication, the digital data may be in the form of a patient medical chart or other electronically-stored digital file information. Many other beneficial uses are possible, such as retrieving account records when calling a financial institution, a utility company, or an insurance company. The digital information may be stored in a database that resides at either endpoint of the video telephony call or within a database server anywhere within the data network. As shown in FIG. 2, patient records 29 may be stored in set-top box 21. This embodiment is useful when records 29 are to be shared with various separate service providers.

In an alternate embodiment of the invention, a voice communication link may be provided within the data network rather than within a traditional telephone network. Therefore, a microphone 30 and a speaker 31 are coupled to set-top box 21 to provide two-way voice communication. In such an embodiment, wherein a telephone number is not dialed by the requester to complete a POTS call to the service provider, some other method is required for initiating a request signal and/or identifying the desired service provider. This can be done using an alert button 32 (such as an emergency alert button or a call button used in hospital rooms) to generate a request signal. If a set-top box is pre-configured to only establish a video telephony session with one service provider workstation, then the request signal need not contain any further information. If multiple service providers are used, then a selection among pre-identified service providers or entry of identifying information can be performed using a computer mouse or keyboard, for example.

In yet another alternative embodiment, a patient monitor 33 or other data sensor or collector is used to generate the digital data to be communicated (rather than retrieving from a pre-existing database). For example, real-time medical monitoring information can be acquired and transmitted in parallel with the video communication link. For instance, a home-bound patient may have a heart monitor that can be remotely accessed by a nurse via the IP data network, thereby providing critical diagnostic data to the nurse as soon as the alert request signal is generated. Furthermore, monitor 33 could detect an emergency condition and automatically generate an alert request signal itself.

Figure 3:
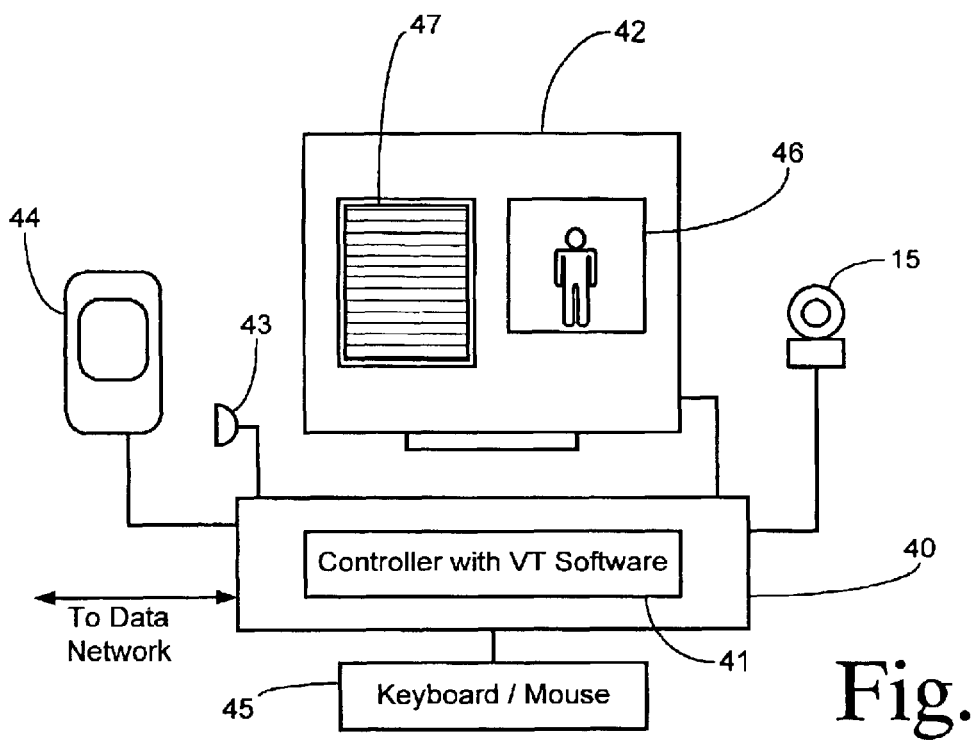
FIG. 3 is a block diagram of one preferred embodiment of a computer network-enabled service provider workstation.

Referring to FIG. 3, a service provider workstation is shown. A personal computer 40 includes a controller 41 for executing video telephony software. Coupled to computer 40 are a video monitor 42, a microphone, 43, a speaker 44, an input device (e.g., a mouse and/or a keyboard) 45, and a video camera 15. When a video telephony session is in progress, the video telephony software generates a video window 46 for displaying video images of the requester received over the data network video communication link and a data window 47 for displaying the requester data record (e.g., received from the data network or from a local database in response to a requester ID that is received over the data network).

Figure 4:
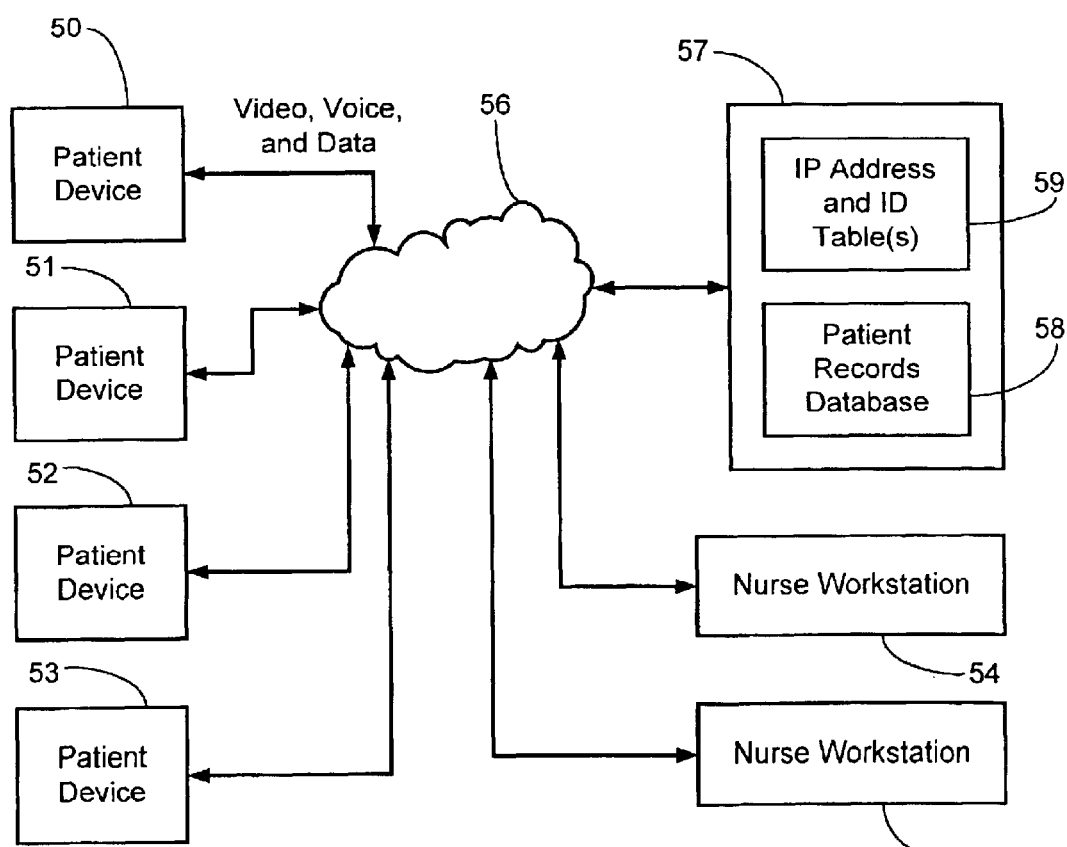
FIG. 4 is a block diagram of a system of the present invention for providing patient communications within a hospital.

FIG. 4 illustrates an embodiment of the present invention adapted for use in a hospital to allow a plurality of patient beds to be monitored from a nurse's station. Patient communication devices 50–53 are television/set-top box combinations or computer workstations deployed in association with respective patient beds in various hospital rooms for communicating with nurse workstations 54 and 55 (in practice, many more patient devices and nurse workstations would be deployed within a single hospital). All patient communication devices are connected to a data network 56 which may be a local area network (LAN). A server 57 is also connected to LAN 56 for serving a patient records database 58 and a database 59 storing tables providing IP addresses and patient ID's. Each patient device 50–53 preferably has a fixed IP address which is associated with each patient bed and/or room. When a particular patient is admitted to a particular bed, then a corresponding table 59 is updated with a patient ID corresponding to the admitted patient and which identifies the matching charts or other records in database 58 for that patient.

In this embodiment, both video and voice communication links may be established over LAN 56. When a patient initiates a request by pressing an alert or emergency button coupled to their patient device, a request message is sent to server 57. The request message includes a source IP address which identifies the corresponding patient communication device. Using that IP address, a patient ID for the patient assigned to a corresponding hospital bed or room is retrieved from table 59. Based on the patient ID, a data record (e.g., one or more computer files) is obtained from database 58. The IP address of a nurse's workstation assigned to provide caregiver services to the corresponding hospital bed may also be identified by consulting table 59 (assuming that there is more than one nurse workstation available). Using that IP address, video and voice communication links are established between the patient device initiating the request and the appropriate nurse's workstation. Once the IP addresses of the endpoints are determined, conventional VoIP may be launched to provide the voice channel.

Figure 5:
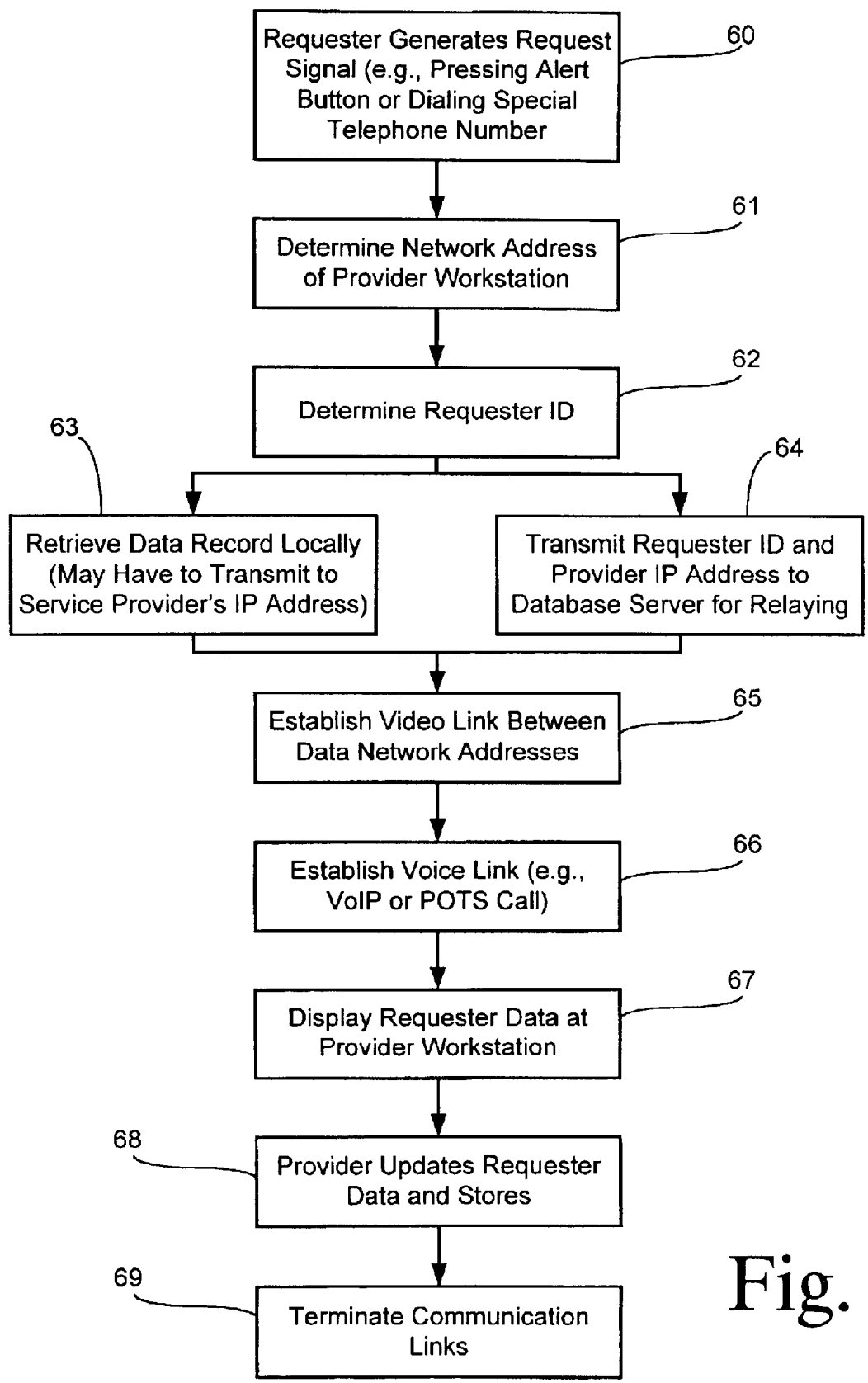
FIG. 5 is a flowchart of a preferred method of the present invention.

One preferred method of the invention is shown in FIG. 5. In step 60, the requester generates a request signal (e.g., by pressing an alert button or dialing a special telephone number for a service provider). The network address of the desired service provider workstation is determined in step 61. As previously described, the network address can be obtained by consulting a database that translates an identifier (such as a telephone number) into an IP address. Alternative, the database may assign a service provider workstation as a function of the identity of the requester (e.g., all hospital beds on a particular floor are assigned to a nurse's workstation on that floor).

In step 62, a requester ID is determined. The requester ID may be preconfigured and automatically transmitted by the requester communication device, or may be determined as a result of a lookup table indexed by the IP address of the requester communication device, or may be supplied manually by the requester under control of the video telephony software, for example. The IP address of the requester device could also be used as the requester ID in some applications.

Depending upon the location of the database storing digital data pertinent to the requester, either step 63 or 64 may be performed. In step 63, the database is located locally at either the requester communication device or the service provider workstation, and, consequently, the appropriate data record is retrieved locally. If accessed by the requester communication device, the data record will be transmitted to the destination network address of the service provider workstation. If locally accessible at the service provider workstation, then a requester ID may be transmitted from the requester device (or a network server doing the requester identification) to the service provider workstation to identify the record to be retrieved.

If the data record is stored on a network server, then the requester ID is transmitted to the server in step 64 together with the IP address of the service provider workstation so that the retrieved data record can be relayed.

In step 65, a video link is established between video telephony software at the IP addresses of the requester device and provider workstation. A voice link is also established in step 66. The voice link may simply be established by the service provider answering an incoming telephone call from the requester. Alternatively, a VoIP connection may be established between the IP addresses in parallel with the video link.

In step 67, the requester data record is displayed on the service provider workstation, thereby supplementing the video and voice communication between the requester and the service provider with automatic generation of digital data to enhance the provision of services by the provider.

If any changes need to be made in the requester's data records as a result of the current call, the provider updates the data and then stores it back into the database in step 68. When a particular session is complete, the video and voice communication links are terminated in step 69. For example, the telephones may be hung up and the relaying of video data packets discontinued.

A particular application of the present invention to communication between a patient and a medical caregiver (e.g., a patient calling their doctor's office for information or advice) is shown in FIG. 6. At step 75, a patient uses a conventional telephone to initiate a conventional telephone call to a nurse. The IP address corresponding to computer equipment used by the nurse is identified by video telephony (VT) software in step 76. This may involve an interaction between a device for capturing a dialed telephone number and a server for storing registration data correlating telephone numbers and IP addresses.

In step 77, a patient records database is queried for a patient file. A notification message is sent to the nurse requesting a video link between the nurse's computer and the patient's computer or set-top box in step 78. In the meantime, the nurse's telephone also rings and a call may be answered. In step 79, the nurse's computer displays a prompt by which the incoming video call can be accepted, and an indication of the nurse's acceptance is made in step 80 (e.g., by clicking an icon).

In step 81, the video link is established and the patient accepts two-way video is step 82. In response to the acceptance of the video link, the VT software forwards the appropriate patient record to the nurse's computer in step 83. The patient record is presented on the monitor of the nurse's workstation in step 84. During display, the record may be edited by the nurse in step 85. An updated record is saved to the database in step 86.

At the end of providing services, the nurse terminates the video and voice links in step 87. A link termination message may be sent to the patient device by the VT software in step 88 and the links are terminated in step 89.

The present invention also contemplates a communication initiated by a service provider to a customer/patient/requester, requiring only straightforward modification of the database or tables mentioned for establishing the network session.

Since video cameras are present at each end of the video telephony call, many useful types of information can be included in the communication session. For is example, a patient could show a vial of prescription medicine to a nurse via the video link. Furthermore, the prescription label may be barcoded to identify the medication, dosage, drug interactions, etc. The barcode could be interpreted by the nurse's workstation which would then automatically uploaded more complete information about the medication to the nurse's display.

What is claimed is:

1. A service provider communication system comprising:
   a computer network-enabled workstation for a service provider;
   a computer network-enabled communication device for a requester in a location remote from said service provider workstation;
   a data network interconnecting said service provider workstation and said requester communication device, said service provider workstation and said requester communication device having respective network addresses;
   a requester information database for storing a data record corresponding to said requester; and
   a network server coupled to said data network for serving said requester information database;
   wherein said requester communication device includes a signaling device for generating a request signal and a controller responsive to said request signal for initiating a video communication link between said requester communication device and said service provider workstation using said respective network addresses, wherein said requester communication device transmits a requester ID to said network server to identify a requester data record, and wherein said network server transmits said identified requester data record for display at said service provider workstation.

2. The system of claim 1 further comprising a voice communication link between said service provider workstation and said requester.

3. The system of claim 2 wherein said voice communication link comprises a switched telephone network.

4. The system of claim 3 wherein said signaling device includes a requester telephone for dialing a predetermined telephone number corresponding to a service provider telephone at said service provider workstation, wherein said controller receives telephone numbers dialed on said requester telephone and compares them with said predetermined telephone number, and wherein said request signal is generated when said telephone numbers match.

5. The system of claim 4 wherein said controller determines said network address of said service provider workstation in response to said predetermined telephone number received from said requester telephone.

6. The system of claim 2 wherein said requester communication device is comprised of a television monitor, a video camera, and a set-top box.

7. The system of claim 2 wherein said service provider workstation is comprised of a display monitor, a video camera, and a personal computer.

8. The system of claim 7 wherein said service provider workstation further comprises a microphone and a speaker, and wherein said voice communication link is established via said data network.

9. The system of claim 1 wherein said requester device transmits said network address of said service provider workstation to said network server, and wherein said network server transmits said identified requester record to said network address of said service provider workstation.

10. The system of claim 1 wherein a requester data record corresponding to a respective requester is retrieved from said requester information database in response to a respective network address of a respective requester communication device establishing a respective video communication link.

11. The system of claim 1 wherein said service provider workstation comprises a medical caregiver workstation and wherein said requester is a medical patient.

12. The system of claim 1 comprising a plurality of computer network-enabled communication devices for respective patients in respective locations remote from said medical caregiver workstation.

13. The system of claim 12 including a plurality of signaling devices for each respective patient communication device, each signaling device including a manual control for manually generating said respective request signal.

14. The system of claim 12 wherein a signaling device of a respective patient communication device includes a respective patient monitor for automatically generating a respective request signal in response to a monitored condition of said respective patient.

15. The system of claim 12 wherein a patient data record corresponding to a respective patient is retrieved from said patient information database in response to a respective network address of a respective patient communication device establishing a respective video communication link.

16. The system of claim 12 wherein each respective patient has a respective patient ID and each respective patient communication device has a respective network address, and wherein said system further comprises a lookup table for correlating a respective patient ID to a respective network address according to a respective remote location where a respective patient is present.

17. The system of claim 16 wherein said remote locations are comprised of hospital beds and wherein said medical caregiver workstation is located at a nurses' station.

18. The system of claim 16 wherein said requester communication device further comprises a microphone and a speaker, and wherein said voice communication link is established via said data network.

19. A method for communicating between a computer network-enabled workstation of a service provider and a computer network-enabled communication device of a requester in a remote location, said method comprising the steps of:
   generating a request signal at said remote location;
   generating a patient ID in response to said request signal;
   retrieving electronic requester data corresponding to said requester ID;

identifying a computer network address of said service provider workstation in response to said request signal;

initiating a video communication link between said requester device and said service provider workstation using said computer network address of said service provider workstation and a computer network address of said requester device;

initiating a voice communication link corresponding to said video communication link; and displaying said electronic requester data at said service provider workstation.

20. The method of claim 19 wherein said voice communication link is comprised of a telephone call via a switched telephone network.

21. The method of claim 20 wherein said generating of a request signal is comprised of the step of dialing a telephone number corresponding to said service provider workstation.

22. The method of claim 21 wherein said computer network address of said service provider workstation is identified in response to said dialed telephone number.

23. The method of claim 19 wherein said service provider is a medical caregiver and wherein said requester is a patient.

24. The method of claim 23 wherein said generating of a request signal is comprised of manually activating an alert control coupled to said patient communication device.

25. The method of claim 23 wherein a plurality of patient devices are located in respective remote locations with respective alert controls and wherein said patient ID is determined in response to which one of said plurality of alert controls is activated.

* * * * *